United States Patent
Hueber et al.

(10) Patent No.: US 10,567,092 B2
(45) Date of Patent: Feb. 18, 2020

(54) SYSTEM TO CALIBRATE PHASE USING SYSTEM INFORMATION

(71) Applicant: NXP B.V., Eindhoven (NL)

(72) Inventors: Gernot Hueber, Gratkorn (AT); Ian Thomas Macnamara, Gratkorn (AT); Johannes Bruckbauer, Gratkorn (AT)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/694,590

(22) Filed: Sep. 1, 2017

(65) Prior Publication Data
US 2019/0074914 A1    Mar. 7, 2019

(51) Int. Cl.
*H04B 17/12* (2015.01)
*H04B 5/00* (2006.01)
(Continued)

(52) U.S. Cl.
CPC ........... *H04B 17/12* (2015.01); *H04B 5/0031* (2013.01); *H04B 5/0056* (2013.01);
(Continued)

(58) Field of Classification Search
CPC ...... H04B 5/0075; H04B 17/12; H04B 17/27; H04B 5/0081; H04B 5/0025;
(Continued)

(56) References Cited

U.S. PATENT DOCUMENTS 5,574,470 A * 11/1996 de Vall ............... G06K 7/10336
340/572.7
7,098,770 B2 * 8/2006 Charrat ............... G06K 7/0008
340/10.1
(Continued)

FOREIGN PATENT DOCUMENTS

CN    103269220 A    8/2013
CN    103269920 A    8/2013
(Continued)

OTHER PUBLICATIONS

Extended European Search Report for Patent Appln. No. 17182588.8 (dated Dec. 6, 2017).
(Continued)

*Primary Examiner* — Devan A Sandiford
(74) *Attorney, Agent, or Firm* — Charlene R. Jacobsen

(57) ABSTRACT

Embodiments of methods and systems for operating a communications device are described. In one embodiment, a method for operating a communications device that communicates via inductive coupling involves adjusting a phase configuration of the communications device in response to at least one system or environmental parameter, modulating a carrier signal with the adjusted phase configuration using active load modulation (ALM), and transmitting the modulated carrier signal from the communications device for inductive coupling. In some embodiments, the at least one system or environmental parameter is selected from one or more of the following: a distance information, a geometric information, a system code, a technology code, a transmitter current and/or a transmitter power, a detuning condition, a quality factor and a resonant frequency of a resonant system.

16 Claims, 6 Drawing Sheets

(51) Int. Cl.
*H04B 17/318* (2015.01)
*H04B 17/27* (2015.01)
*H04L 7/033* (2006.01)

(52) U.S. Cl.
CPC ........... *H04B 5/0075* (2013.01); *H04B 17/27* (2015.01); *H04B 17/318* (2015.01); *H04L 7/0331* (2013.01)

(58) Field of Classification Search
CPC .. H04B 5/0031; H04B 5/0056; H04B 5/0062; H04B 5/0068; H04L 7/033
See application file for complete search history.

(56) References Cited

U.S. PATENT DOCUMENTS

| | | | |
|---|---|---|---|
| 7,667,572 B2* | 2/2010 | Husak | G06K 17/0029 340/10.1 |
| 7,712,672 B2* | 5/2010 | Takahashi | G06K 7/10336 235/492 |
| 7,764,236 B2* | 7/2010 | Hill | H01Q 1/243 343/702 |
| 7,876,284 B2 | 1/2011 | Mizoroki et al. | |
| 8,261,997 B2 | 9/2012 | Gebhart | |
| 8,305,778 B2 | 11/2012 | Jiang-Hafner | |
| 8,461,993 B2* | 6/2013 | Mickle | G06K 7/10178 340/10.1 |
| 8,466,791 B2* | 6/2013 | Goto | H01Q 7/00 340/572.7 |
| 8,472,560 B2 | 6/2013 | Rezayee et al. | |
| 8,537,574 B2 | 9/2013 | Isogai et al. | |
| 8,913,955 B1* | 12/2014 | Mincher | H04B 5/0075 455/41.1 |
| 8,947,212 B2 | 2/2015 | Tseng | |
| 8,982,070 B2 | 3/2015 | Tomimori | |
| 9,100,825 B2 | 8/2015 | Schultz et al. | |
| 9,245,165 B2 | 1/2016 | Slaby et al. | |
| 9,331,378 B2 | 5/2016 | Merlin et al. | |
| 9,331,748 B2* | 5/2016 | Bernard | G06K 19/0723 |
| 9,396,368 B1* | 7/2016 | Lamba | G06K 7/10148 |
| 9,550,473 B2 | 1/2017 | Bex et al. | |
| 9,755,702 B2* | 9/2017 | Cho | H04B 5/0062 |
| 9,806,771 B1* | 10/2017 | Hueber | H04B 5/0075 |
| 9,918,280 B1* | 3/2018 | Hueber | H04W 52/18 |
| 9,929,779 B2* | 3/2018 | Hung | H04B 5/0037 |
| 9,935,689 B2* | 4/2018 | Hueber | H04B 5/0056 |
| 9,985,732 B2* | 5/2018 | Cordier | H04B 17/21 |
| 10,135,257 B1* | 11/2018 | Adolf | H02J 50/12 |
| 10,243,767 B2 | 3/2019 | Nakano et al. | |
| 10,333,535 B1* | 6/2019 | Mendel | H03L 7/23 |
| 10,334,421 B2* | 6/2019 | Cho | H04W 4/80 |
| 2007/0013427 A1 | 1/2007 | Nomura | |
| 2008/0100527 A1* | 5/2008 | Rahim | H01Q 1/22 343/867 |
| 2008/0112193 A1 | 5/2008 | Yan et al. | |
| 2009/0091501 A1* | 4/2009 | Mizoroki | G06K 19/07749 343/702 |
| 2009/0174556 A1* | 7/2009 | Horne | G06K 19/07336 340/572.3 |
| 2009/0191812 A1* | 7/2009 | Teruyama | G06K 7/0008 455/41.1 |
| 2009/0295526 A1 | 12/2009 | Mikami et al. | |
| 2010/0079261 A1* | 4/2010 | Goto | H04B 5/0075 340/10.51 |
| 2010/0257594 A1* | 10/2010 | Morita | G06Q 20/343 726/5 |
| 2011/0068178 A1* | 3/2011 | Gebhart | G06K 19/07749 235/492 |
| 2011/0128125 A1* | 6/2011 | Kai | H01Q 1/2216 340/10.1 |
| 2011/0149614 A1 | 6/2011 | Stracquadaini | |
| 2012/0071089 A1* | 3/2012 | Charrat | G06K 19/0723 455/41.1 |
| 2012/0105211 A1* | 5/2012 | Rezayee | G06K 7/10128 340/10.2 |
| 2012/0238899 A1* | 9/2012 | Bacquet | G06K 7/0008 600/549 |
| 2013/0033905 A1 | 2/2013 | Lin et al. | |
| 2013/0050533 A1 | 2/2013 | Park et al. | |
| 2013/0084798 A1* | 4/2013 | Faithorn | H04W 76/14 455/41.1 |
| 2013/0257599 A1* | 10/2013 | Tseng | G06K 19/073 340/10.5 |
| 2013/0288599 A1* | 10/2013 | Bernard | G06K 19/0723 455/41.1 |
| 2013/0321230 A1* | 12/2013 | Merlin | H01Q 1/2225 343/787 |
| 2014/0003548 A1* | 1/2014 | Lefley | H04B 5/0075 375/268 |
| 2014/0011461 A1* | 1/2014 | Bakalski | H04B 1/3805 455/78 |
| 2014/0038662 A1* | 2/2014 | Alberth, Jr. | H01P 1/18 455/550.1 |
| 2014/0185459 A1 | 7/2014 | Guo et al. | |
| 2014/0218176 A1* | 8/2014 | Thueringer | G05B 13/02 340/10.5 |
| 2014/0273828 A1* | 9/2014 | Yang | H04B 15/00 455/41.1 |
| 2015/0063517 A1* | 3/2015 | Verlinden | H04L 7/0079 375/376 |
| 2015/0074615 A1 | 3/2015 | Han et al. | |
| 2015/0089635 A1 | 3/2015 | Alpert et al. | |
| 2015/0111495 A1* | 4/2015 | Van Nieuwenhuyze | H04W 40/02 455/41.1 |
| 2015/0126111 A1* | 5/2015 | Socol | G06K 19/0723 455/41.1 |
| 2015/0235018 A1 | 8/2015 | Gupta et al. | |
| 2015/0262052 A1 | 9/2015 | Pahuja | |
| 2015/0280584 A1 | 10/2015 | Gong et al. | |
| 2016/0026780 A1 | 1/2016 | Wu et al. | |
| 2016/0072556 A1* | 3/2016 | Lee | H04B 5/0075 455/41.1 |
| 2016/0094187 A1 | 3/2016 | Staudinger et al. | |
| 2016/0134382 A1* | 5/2016 | Mofidi | G06K 7/10336 455/41.1 |
| 2016/0140379 A1 | 5/2016 | Pedersen | |
| 2016/0142113 A1* | 5/2016 | Gaethke | H04B 5/0093 455/41.1 |
| 2016/0197718 A1* | 7/2016 | Michel | G06K 19/0723 375/300 |
| 2016/0210624 A1 | 7/2016 | Niu | |
| 2016/0241380 A1* | 8/2016 | Ghahramani | H04L 7/0012 |
| 2016/0241384 A1* | 8/2016 | Frantzeskakis | H04L 7/02 |
| 2017/0141583 A1* | 5/2017 | Adolf | H02J 5/005 |
| 2017/0141584 A1* | 5/2017 | DeVaul | H04W 76/14 |
| 2017/0163357 A1* | 6/2017 | Cordier | H04B 17/21 |
| 2017/0169258 A1* | 6/2017 | Neffe | G06K 7/10198 |
| 2017/0300723 A1* | 10/2017 | Kovacic | G06K 19/0723 |
| 2018/0006801 A1* | 1/2018 | Hung | G06K 19/0723 |
| 2018/0013596 A1* | 1/2018 | Nakano | G06K 19/07 |
| 2018/0025267 A1* | 1/2018 | Kunc | G06K 19/0772 |
| 2018/0034510 A1* | 2/2018 | Hueber | H04B 5/0056 |
| 2018/0034621 A1* | 2/2018 | Hueber | H04L 7/033 |
| 2018/0034622 A1* | 2/2018 | Hueber | H04B 17/318 |
| 2018/0132017 A1* | 5/2018 | Giuliani | H04R 1/00 |
| 2018/0287669 A1* | 10/2018 | Nakano | H04B 5/0068 |
| 2019/0074914 A1* | 3/2019 | Hueber | H04B 17/318 |
| 2019/0088098 A1* | 3/2019 | Gangumalla | G08B 13/20 |
| 2019/0148978 A1* | 5/2019 | Chang | H02J 7/025 |
| 2019/0273504 A1* | 9/2019 | Mendel | H03L 7/23 |

FOREIGN PATENT DOCUMENTS

| | | |
|---|---|---|
| EP | 2 680 457 A2 | 1/2014 |
| EP | 2 763 076 A1 | 8/2014 |
| EP | 2 988 427 A1 | 2/2016 |

(56) References Cited

FOREIGN PATENT DOCUMENTS

| EP | 3 179 639 A1 | 6/2017 |
|---|---|---|
| EP | 3 280 062 A1 | 2/2018 |

OTHER PUBLICATIONS

Office action for related U.S. Appl. No. 15/244,925 (dated May 10, 2017).
Office action for related U.S. Appl. No. 15/244,925 (dated Nov. 7, 2017).
Advisory Action for related U.S. Appl. No. 15/244,925 (dated Feb. 22, 2018).
Office action for related U.S. Appl. No. 15/244,925 (dated Nov. 30, 2018).
Gebhart, M. et al. "Properties of a Test Bench to Verify Standard Compliance of Proximity Transponders", IEEE 6th International Symposim on Communication Systems, Networks and Digital Signal Processing, 5 pgs. (Jul. 2008).
Gebhart, M. et al. "Design of 13.56 MHz Smartcard Stickers with Ferrite for Payment and Authentication", IEEE 2011 Third International Workshop on Near Field Communication, pp. 59-64 (Feb. 2011).
Gebhart. M. et al. "Active Load Modulation for Contactless Near-Field Communication", IEEE International Conference on RFID-Technologies and Applications, 6 pgs. (Nov. 2012).
Stark, M. et al. Phase-Synchronicity in Active Load Modulation for NFC and Proximity, 5th International Workshop on Near Field Communication, (Feb. 2013).
Stark, M. et al. "How to guarantee Phase-Synchronicity in Active Load Modulation for NFC and Proximity", IEEE 5th International Workshop on Near Field Communication, 6 pgs. (Feb. 2013).
Notice of Allowance; U.S. Appl. No. 15/224,925; 5 pages (dated Feb. 28, 2018).
Notice of Allowance; U.S. Appl. No. 15/224,925; 5 pages (dated Jul. 9, 2018).
Final Office action for related U.S. Appl. No. 15/244,925; 18 pages (dated Jun. 13, 2019).
Non Final Office Action; U.S. Appl. No. 15/224,925; pages (dated Oct. 4, 2019).

\* cited by examiner

SYSTEM TO CALIBRATE PHASE USING SYSTEM INFORMATION

CROSS REFERENCE TO RELATED APPLICATIONS

This application is related to U.S. patent application Ser. No. 15/224,925, entitled "METHOD AND SYSTEM FOR OPERATING A COMMUNICATIONS DEVICE THAT COMMUNICATES VIA INDUCTIVE COUPLING" filed on Aug. 1, 2016, which is being incorporated herein by reference in its entirety.

FIELD

The described embodiments relate generally to methods and systems for operating a communications device, and more particularly to methods and systems for operating a communications device that communicates via inductive coupling.

BACKGROUND

Radio frequency identification (RFID) device transponders that utilize near field communications (NFC) typically can be configured for either passive load modulation (PLM) or active load modulation (ALM). While ALM is typically more complex than PLM, components for implementing ALM in a transponder (e.g., a mobile device) can be more compact and, because the transponder utilizes a power source to generate a magnetic field rather than just modulate a magnetic field created by a reader, an ALM transponder can have greater communications range than a PLM transponder.

SUMMARY

Embodiments of methods and systems for operating a communications device are described. In an embodiment, a method for operating a communications device that communicates via inductive coupling involves adjusting a phase configuration of the communications device in response to at least one system or environmental parameter, modulating a carrier signal with the adjusted phase configuration using ALM, and transmitting the modulated carrier signal from the communications device for inductive coupling.

In an embodiment, the at least one system or environmental parameter is selected from one or more of the following: a distance information, a geometric information, a system code, a technology code, a transmitter current and/or a transmitter power, a detuning condition, a quality factor of a resonant system associated with the communications device, a resonant frequency of the resonant system associated with the communications device, a field strength of inductive coupling, a coupling condition of inductive coupling, an antenna geometry of the communications device or a corresponding reader, a process, voltage and temperature (PVT) variation of the communications device, a system architecture of the communications device, a matching network characteristic of the communications device, a communications protocol of the communications device, a communications data rate of the communications device, a retransmission configuration of the communications device, a reconfiguration setting of the communications device, a communications timing of the communications device, and an application of the communications device.

In an embodiment, the distance information is determined using a proximity sensor.

In an embodiment, the proximity sensor is selected from one or more of the following: ultrasonic sensor, infrared sensor, laser sensor, camera sensor, light sensor, and audio sensor.

In an embodiment, the system code and/or the technology code is associated with NFC Forum Digital Protocol.

In an embodiment, the resonant system is comprised of a reader and a target.

In an embodiment, adjusting the phase configuration of the communications device involves adjusting the phase configuration of the communications device according to a function of a group of system or environmental parameters.

In an embodiment, adjusting the phase configuration of the communications device involves adjusting a phase configuration of an analog receiver of the communications device.

In an embodiment, adjusting the phase configuration of the analog receiver involves selecting a set of tap points of a delay-locked loop (DLL) of the analog receiver or operating a phase shifter or a tunable filter of the analog receiver.

In an embodiment, adjusting the phase configuration of the communications device involves adjusting a phase configuration of a clock generation circuit of the communications device.

In an embodiment, adjusting the phase configuration of the clock generation circuit involves selecting a set of tap points of a phase-locked loop (PLL) of the clock generation circuit or operating a phase shifter or a delay line of the clock generation circuit.

In an embodiment, adjusting the phase configuration of the communications device involves adjusting a phase configuration of an analog transmitter of the communications device.

In an embodiment, adjusting the phase configuration of the communications device involves adjusting the phase configuration of the communications device before a transmission of a data frame.

In an embodiment, adjusting the phase configuration of the communications device involves adjusting the phase configuration of the communications device during a transmission of a data frame.

In an embodiment, the method further involves obtaining the at least one system or environmental parameter during a startup of the communications device or before each data frame transmission.

In an embodiment, a system for operating a communications device that communicates via inductive coupling includes a phase configuration adjustment module configured to adjust a phase configuration of the communications device in response to at least one system or environmental parameter, a signal modulation module configured to modulate a carrier signal with the adjusted phase configuration using ALM, and a signal transmission module configured to transmit the modulated carrier signal from the communications device for inductive coupling.

In an embodiment, the at least one system or environmental parameter is selected from one or more of the following: a distance information, a geometric information, a system code, a technology code, a transmitter current and/or a transmitter power, a detuning condition, a quality factor of a resonant system associated with the communications device, a resonant frequency of the resonant system associated with the communications device, a field strength of inductive coupling, a coupling condition of inductive coupling, an antenna geometry of the communications device or a corresponding reader, a process, voltage and temperature (PVT) variation of the communications device, a system architecture of the communications device, a matching network characteristic of the communications device, a communications protocol of the communications device, a communications data rate of the communications device, a retransmission configuration of the communications device, a reconfiguration setting of the communications device, a communications timing of the communications device, and an application of the communications device.

In an embodiment, the phase configuration adjustment module is further configured to adjust the phase configuration of the communications device according to a function of a group of system or environmental parameters.

In an embodiment, the phase configuration adjustment module is further configured to select a set of tap points of a DLL or operate a phase shifter or a tunable filter.

In an embodiment, the phase configuration adjustment module is further configured to select a set of tap points of a PLL or operate a phase shifter or a delay line.

In an embodiment, the phase configuration adjustment module is further configured to adjust the phase configuration of the communications device before a transmission of a data frame.

In an embodiment, a method for operating a communications device that communicates via inductive coupling involves adjusting the phase of a carrier signal in response to at least one system or environmental parameter, modulating the carrier signal with the adjusted phase using ALM, and transmitting the modulated carrier signal from the communications device for inductive coupling.

In an embodiment, the at least one system or environmental parameter is selected from one or more of the following: a distance information, a geometric information, a system code, a technology code, a transmitter current and/or a transmitter power, a detuning condition, a quality factor of a resonant system associated with the communications device, a resonant frequency of the resonant system associated with the communications device, a field strength of inductive coupling, a coupling condition of inductive coupling, an antenna geometry of the communications device or a corresponding reader, a process, voltage and temperature (PVT) variation of the communications device, a system architecture of the communications device, a matching network characteristic of the communications device, a communications protocol of the communications device, a communications data rate of the communications device, a retransmission configuration of the communications device, a reconfiguration setting of the communications device, a communications timing of the communications device, and an application of the communications device.

In an embodiment, adjusting the phase configuration of the communications device involves adjusting the phase configuration of the communications device according to a function of a group of system or environmental parameters.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
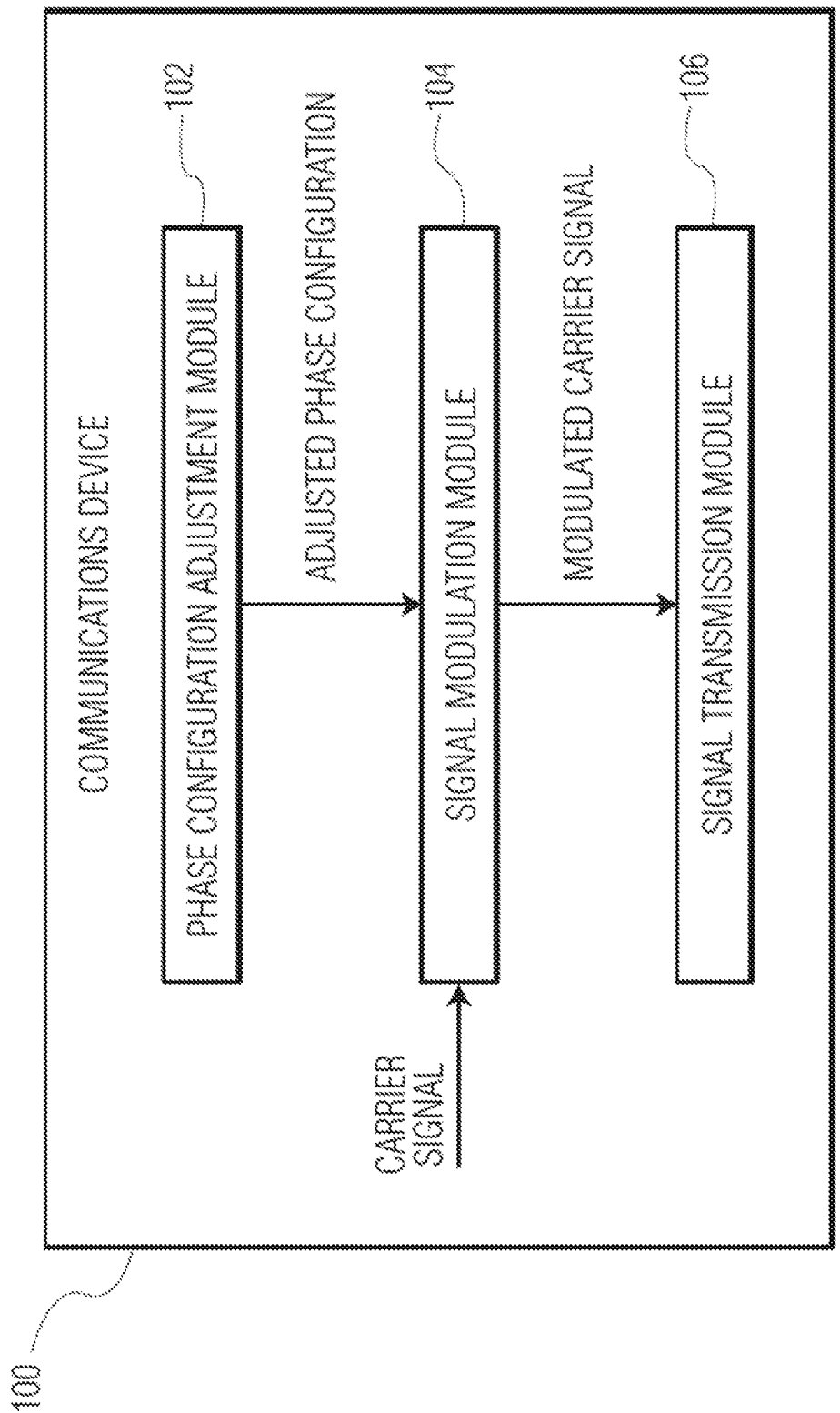
FIG. 1 is a functional block diagram of a communications device in accordance with an embodiment of the invention.

FIG. 1 is a functional block diagram of a communications device 100 in accordance with an embodiment of the invention. In the embodiment depicted in FIG. 1, the communications device communicates via inductive coupling. The communications device may include a phase configuration adjustment module 102, a signal modulation module 104, and a signal transmission module 106. The communications device may be an integrated circuit (IC) device. In some embodiments, the communications device is implemented in a handheld computing system or a mobile computing system, such as a mobile phone. The communications device may be a near field communications (NFC) device that utilizes inductive coupling to communicate. In some embodiments, the communications device is implemented as an RF transponder compatible with the International Organization for Standardization (ISO)/the International Electrotechnical Commission (IEC) 14443 standard. Although the illustrated communications device is shown with certain components and described with certain functionality herein, other embodiments of the communications device may include fewer or more components to implement the same, less, or more functionality.

In the embodiment depicted in FIG. 1, the phase configuration adjustment module 102 is configured to adjust a phase configuration of the communications device in response to at least one system or environmental parameter. The phase configuration of the communications device may reflect an input/output phase behavior of the communications device. For example, the phase configuration of the communications device may be a relative phase setting between the received signal phase and the transmitted carrier phase. Different readers (e.g., readers of different manufacturers, readers of different models, readers of different types) may have different antennas, different matching networks, and different relative locations with respect to the communications device, which can impact the channel and thus the channel phase between the communications device and the reader. Adjusting the phase configuration based on one or more system or environmental parameters to achieve a phase setting with good signal noise ratio (SNR) can provide robust communications across different readers and different inductive coupling positions.

Examples of system or environmental parameters used by the phase configuration adjustment module 102 may include, without being limited to, a distance information, a geometric information, a system code, a technology code, a transmitter current and/or a transmitter power, a detuning condition, a quality factor of a resonant system associated with the communications device, a resonant frequency of the resonant system associated with the communications device, a field strength of inductive coupling, a coupling condition of inductive coupling, an antenna geometry of the communications device or a corresponding reader, a process, voltage and temperature (PVT) variation of one or more components of the communications device, a system architecture of the communications device, a matching network characteristic of the communications device, a communications protocol of the communications device, the communications data rate of the communications device, a retransmission configuration of the communications device, a reconfiguration setting of the communications device, a communications timing of the communications device, and an application of the communications device. The system or environmental parameter may include a combination of two or more system or environmental parameters as listed above. In some embodiments, the phase configuration adjustment module is further configured to adjust the phase of the carrier signal according to a function of a group of system or environmental parameters.

The phase configuration adjustment module 102 may be configured to adjust the transmission carrier phase configuration of the communications device 100 before a transmission of a data frame or adjust the transmission carrier phase configuration of the communications device statically, dynamically, or "on-the-fly" during transmission of a data frame. In some embodiments, the phase configuration adjustment module is configured to adjust the transmission carrier phase configuration of the communications device during or after production but before being distributed to consumers/end users. In some embodiments, the at least one system or environmental parameter is obtained during a startup of the communications device or before each data frame transmission.

In the embodiment depicted in FIG. 1, the signal modulation module 104 is configured to modulate a carrier signal with the adjusted phase configuration using ALM. The signal transmission module may include a clock recovery circuit and an analog transmitter.

In the embodiment depicted in FIG. 1, the signal transmission module 106 is configured to transmit the modulated carrier signal from the communications device for inductive coupling. The signal transmission module may include an induction type antenna such as a loop antenna.

In some embodiments, the communications device 100 is an active load modulation (ALM) device. In such embodiments, the signal transmission module can be configured to generate its own magnetic field for transmitting the outgoing RF using a current source, which results in greater communications distances compared to passive load modulation (PLM) systems. When the communications device and a corresponding reader both generate a magnetic field, the inductive coupling between the communications device and the corresponding reader can be affected by one or more system or environmental parameters. Consequently, the magnetic fields may be misaligned because of one or more system or environmental parameters. The misalignment in magnetic fields can decrease the signal strength in the amplitude portion of the modulation, resulting in lower communications performance (e.g., lower SNR). Typically, in order to keep the magnetic fields of an ALM device and a reader from becoming misaligned and interfering with one another (e.g., to maintain a constant phase during transmission), components with very low error-tolerance are used in the transponder. However, the low error-tolerant components can be costly. In the embodiment depicted in FIG. 1, a phase configuration of the communications device is adjusted in response to at least one system or environmental parameter, for example, to reduce misalignment in magnetic fields between the communications device and a corresponding reader. Because the phase configuration of the communications device is adjusted in response to at least one system or environmental parameter, components with greater error-tolerance can be used in the RFID device while still maintaining the desired phase arrangement during transmission. In addition, costly resonance tuning of devices in mass production can be reduced or even avoided. Further, the robustness in communications stability for certain types of readers (e.g., reader devices based on envelope detection) can be improved. Additionally, user experience can be boosted by providing more consistent performance over various production, system, protocol, and application conditions. Further, variations in IC behavior due to PVT can be compensated for.

Figure 2:
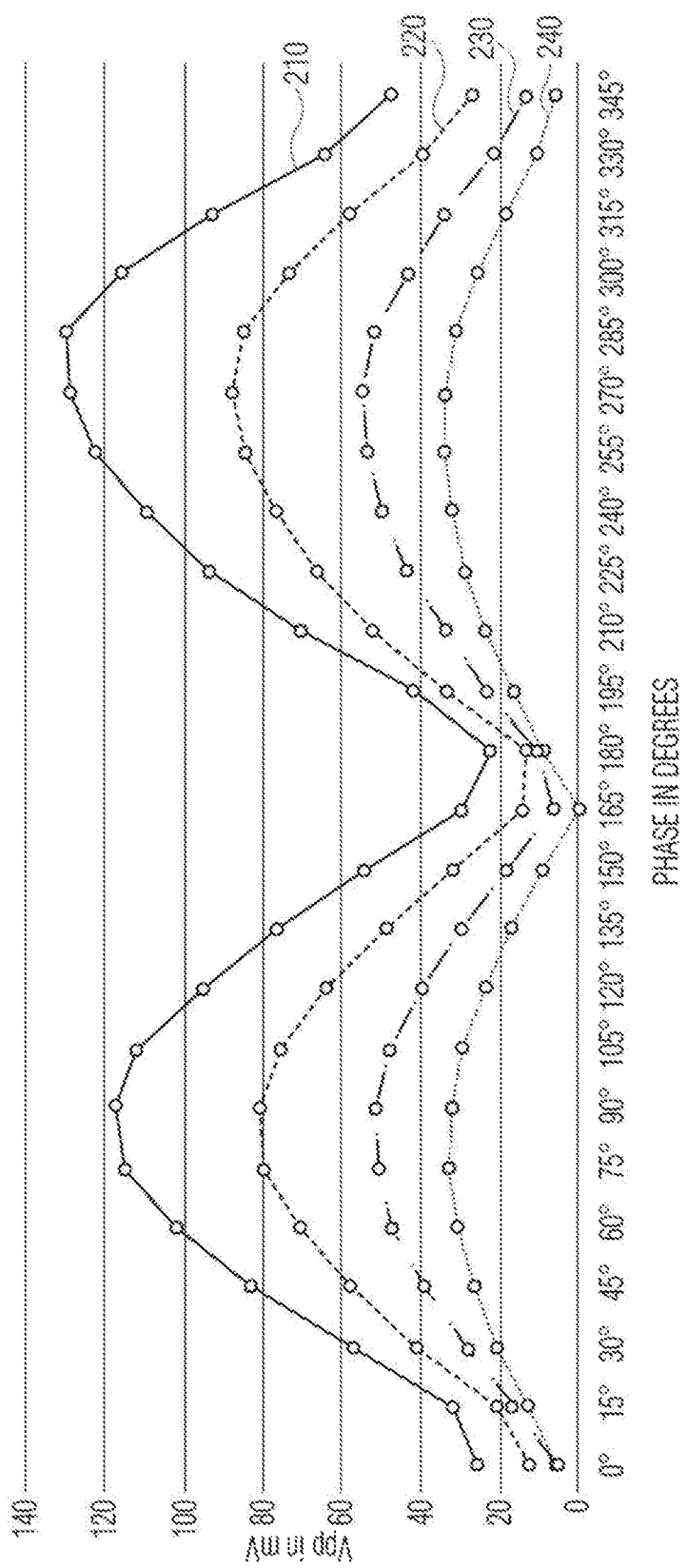
FIG. 2 depicts a diagram of example phase configurations of the communications device depicted in FIG. 1 versus load modulation amplitudes under different inductive coupling conditions.

FIG. 2 depicts a diagram of example phase configurations of the communications device 100 depicted in FIG. 1 versus load modulation amplitudes under different inductive coupling conditions. Load modulation amplitudes may be output signal amplitudes of the communications device. In the diagram of FIG. 2, the phase configurations of the communications device 100 are relative phase settings between the received signal phase and the carrier phase in degrees and the load modulation amplitudes are in millivolts (mV). As depicted in FIG. 2, four curves 210, 220, 230, 240 represent four different inductive coupling conditions. For each inductive coupling condition, the load modulation amplitude initially increases with an increase in relative phase settings until a first peak (e.g., representing the positive load modulation amplitude), subsequently decreases with an increase in phase until a lowest point, then increases with an increase in phase until a second peak (e.g., representing the absolute value of the negative load modulation amplitude), and subsequently decreases with an increase in phase. However, for different inductive coupling conditions, peaks of the load modulation amplitudes occur at different phases. By statically or dynamically adjusting the phase, the load modulation amplitude is modified to achieve a high signal-to-noise ratio (SNR) and/or dynamic range at the reader device across a respective inductive coupling condition and environmental parameter.

Figure 3:
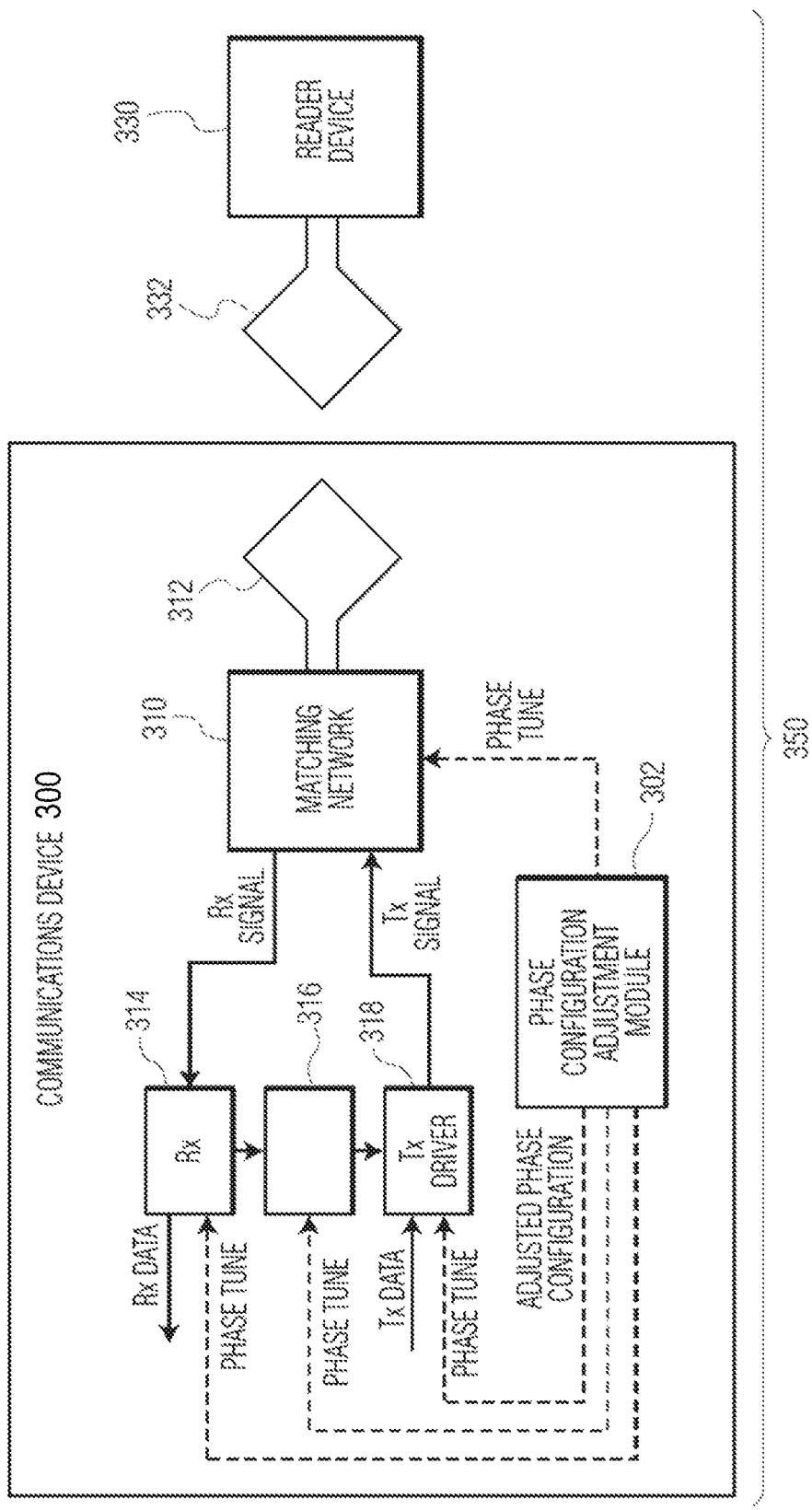
FIG. 3 depicts a first embodiment of the communications device depicted in FIG. 1 that can be used with a corresponding reader to form an inductively coupled communications system.

FIG. 3 depicts a first embodiment of the communications device 100 depicted in FIG. 1 that can be used with a corresponding reader 330 to form an inductively coupled communications system 350. The corresponding reader may be a dedicated reader device or a communications device in reader-mode. In the embodiment depicted in FIG. 3, a communications device 300 includes a phase configuration adjustment module 302, a matching network 310 that is coupled to an antenna 312, an analog receiver "RX" 314, a clock generation circuit 316, and an analog transmitter "TX" 318. The antenna may be an induction type antenna such as a loop antenna. The clock generation circuit generates a clock that is synchronous to the received clock and thus synchronous to the carrier sent out by the reader. In an example operation of the communications device, an RF signal is received by the antenna via inductive coupling from an antenna 332 of the corresponding reader and is passed to the analog receiver to convert the RF signal into a digital signal. A signal is generated from the RF signal by the clock generation circuit and is used to produce an outgoing RF signal at the analog transmitter, which is transmitted via inductive coupling using the antenna. The communications device 300 depicted in FIG. 3 is one possible embodiment of the communications device 100 depicted in FIG. 1. However, the communications device depicted in FIG. 1 is not limited to the embodiment shown in FIG. 3 and the embodiment shown in FIG. 6.

In some embodiments, the communications device 300 is an active load modulation (ALM) device. In these embodiments, the antenna can be configured to generate its own magnetic field for transmitting the outgoing RF using a current source, which can result in greater communications distances than PLM devices. In the embodiment depicted in FIG. 3, a phase configuration of the communications device is adjusted in response to at least one system or environmental parameter. Because the phase configuration of the communications device is adjusted in response to at least one system or environmental parameter, components with greater error-tolerance can be used in the RFID device while still maintaining the desired phase arrangement during transmission. The corresponding reader is capable of demodulating the signal because the amplitude of the RF signal captured from the communications device has sufficient SNR and dynamic range.

The phase configuration adjustment module 302 can adjust phase configurations in various components of the communications device. The phase configuration adjustment module can adjust phase configurations in various components of the communications device statically, dynamically, or on-the-fly. The phase configuration adjustment module also can adjust phase configurations in various components of the communications device at the time of production and before distribution to consumers/end users. In the embodiment depicted in FIG. 3, the phase configuration adjustment module can adjust phase configurations in the analog receiver "RX" 314, the clock generation circuit 316, and/or the analog transmitter "TX" 318. Although the illustrated phase configuration adjustment module is shown as being separate from the analog receiver, the clock generation circuit, and the analog transmitter, in some embodiments, the phase configuration adjustment module or some portion thereof is implemented within the analog receiver, the clock generation circuit, and/or the analog transmitter.

In some embodiments, the phase configuration adjustment module 302 adjusts the phase configuration of the analog receiver "RX" 314. In an embodiment, the phase configuration adjustment module is implemented within the analog receiver as a delay-locked loop (DLL) whose tap points can be selected (e.g., via a multiplexer based on a recovered clock signal) so as to select a particular phase delay. In another embodiment, the phase configuration adjustment module is implemented within the analog receiver as a dedicated phase shifter. In yet another embodiment, the phase configuration adjustment module is implemented within the analog receiver as a tunable filter (e.g., a bandpass filter).

In some embodiments, the phase configuration adjustment module 302 adjusts the phase configuration of the clock generation circuit 316. In an embodiment, the phase configuration adjustment module is implemented within the clock generation circuit as a delay-locked loop (DLL) whose tap points can be adjusted so as to select a particular phase delay. In another embodiment, the phase configuration adjustment module is implemented within the clock generation circuit as a divider stage used with an integer phase-locked loop (PLL) or a fractional PLL that can be tuned to the desired phase setting. In yet another embodiment, the phase configuration adjustment module is implemented within the clock generation circuit as a dedicated phase shifter. In yet another embodiment, the phase configuration adjustment module is implemented within the clock generation circuit as a clock delay line (e.g. as a buffer).

In some embodiments, the phase configuration adjustment module 302 adjusts the phase configuration of the analog transmitter "TX" 318. In an embodiment, the phase configuration adjustment module is implemented within the analog transmitter as an inverter that can invert signals to be transmitted. In another embodiment, the phase configuration adjustment module is implemented within the analog transmitter as a delay element in the clock path. In yet another embodiment, the phase configuration adjustment module is implemented within the analog transmitter as a slew rate control device.

Figure 4:
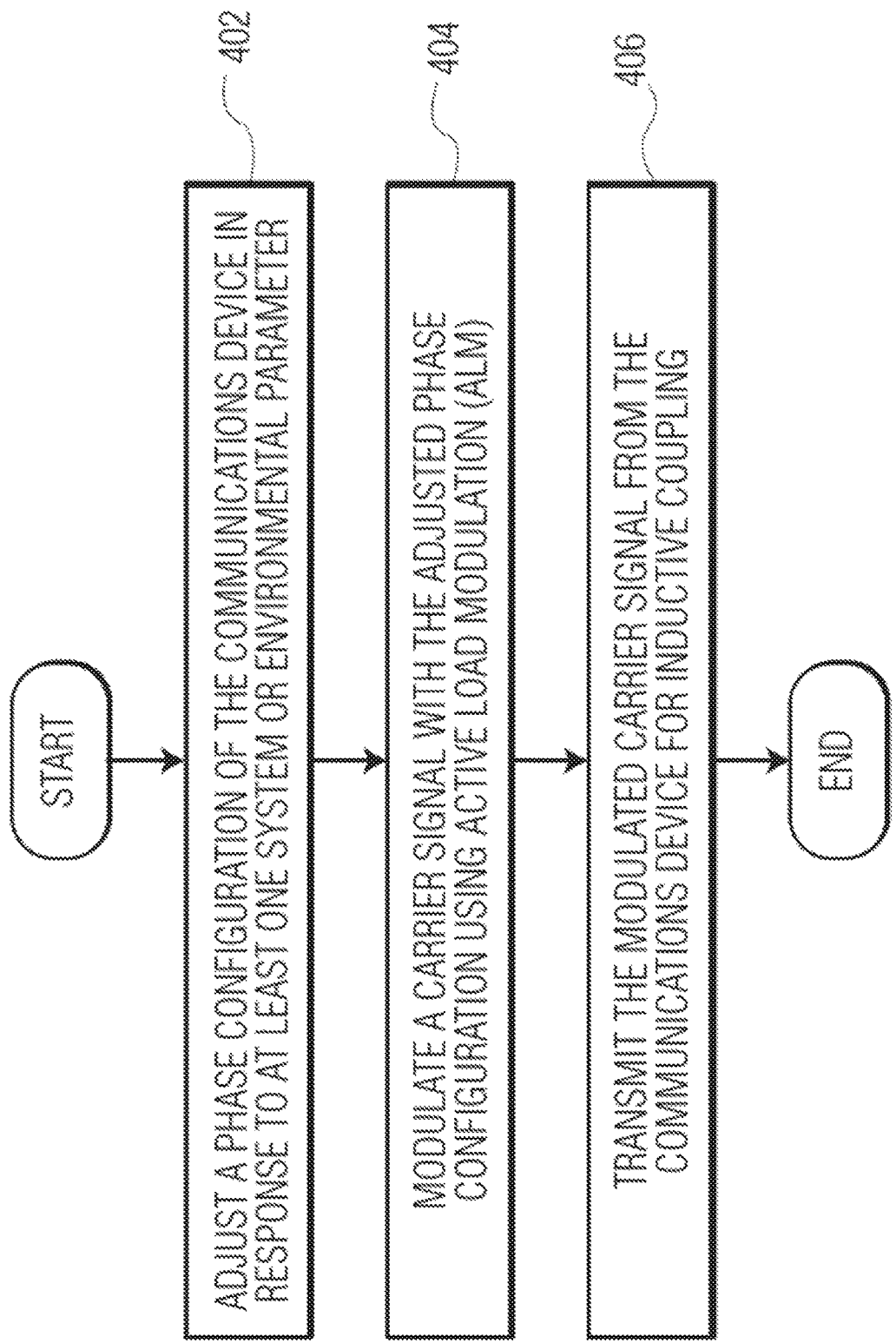
FIG. 4 is a process flow diagram of a method for operating a communications device that communicates via inductive coupling in accordance with an embodiment of the invention.

FIG. 4 is a process flow diagram of a method for operating a communications device that communicates via inductive coupling in accordance with an embodiment of the invention. At block 402, a phase configuration of the communications device is adjusted in response to at least one system or environmental parameter. At block 404, a carrier signal with the adjusted phase configuration is modulated using ALM. At block 406, the modulated carrier signal is transmitted from the communications device for inductive coupling. The communications device may be the same or similar to the communications device 100 depicted in FIG. 1, and/or the communications device 300 depicted in FIG. 3, and/or the communications device 600 depicted in FIG. 6.

Figure 5:
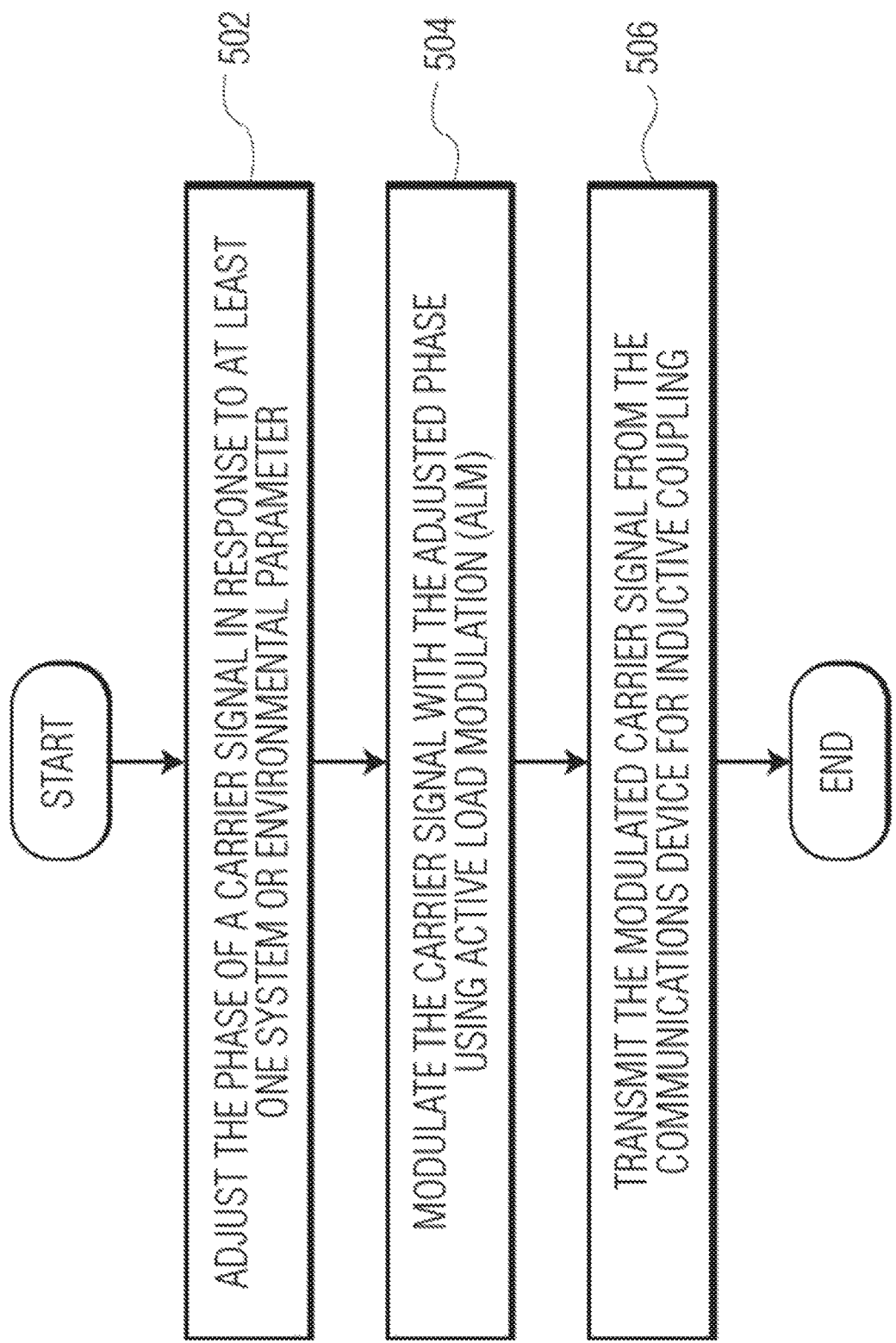
FIG. 5 is a process flow diagram of a method for operating a communications device that communicates via inductive coupling in accordance with another embodiment of the invention.

FIG. 5 is a process flow diagram of a method for operating a communications device that communicates via inductive coupling in accordance with another embodiment of the invention. At block 502, the phase of a carrier signal is adjusted in response to at least one system or environmental parameter. At block 504, the carrier signal with the adjusted phase is modulated using ALM. At block 506, the modulated carrier signal is transmitted from the communications device for inductive coupling. The communications device may be the same or similar to the communications device 100 depicted in FIG. 1, and/or the communications device 300 depicted in FIG. 3, and/or the communications device 600 depicted in FIG. 6.

Figure 6:
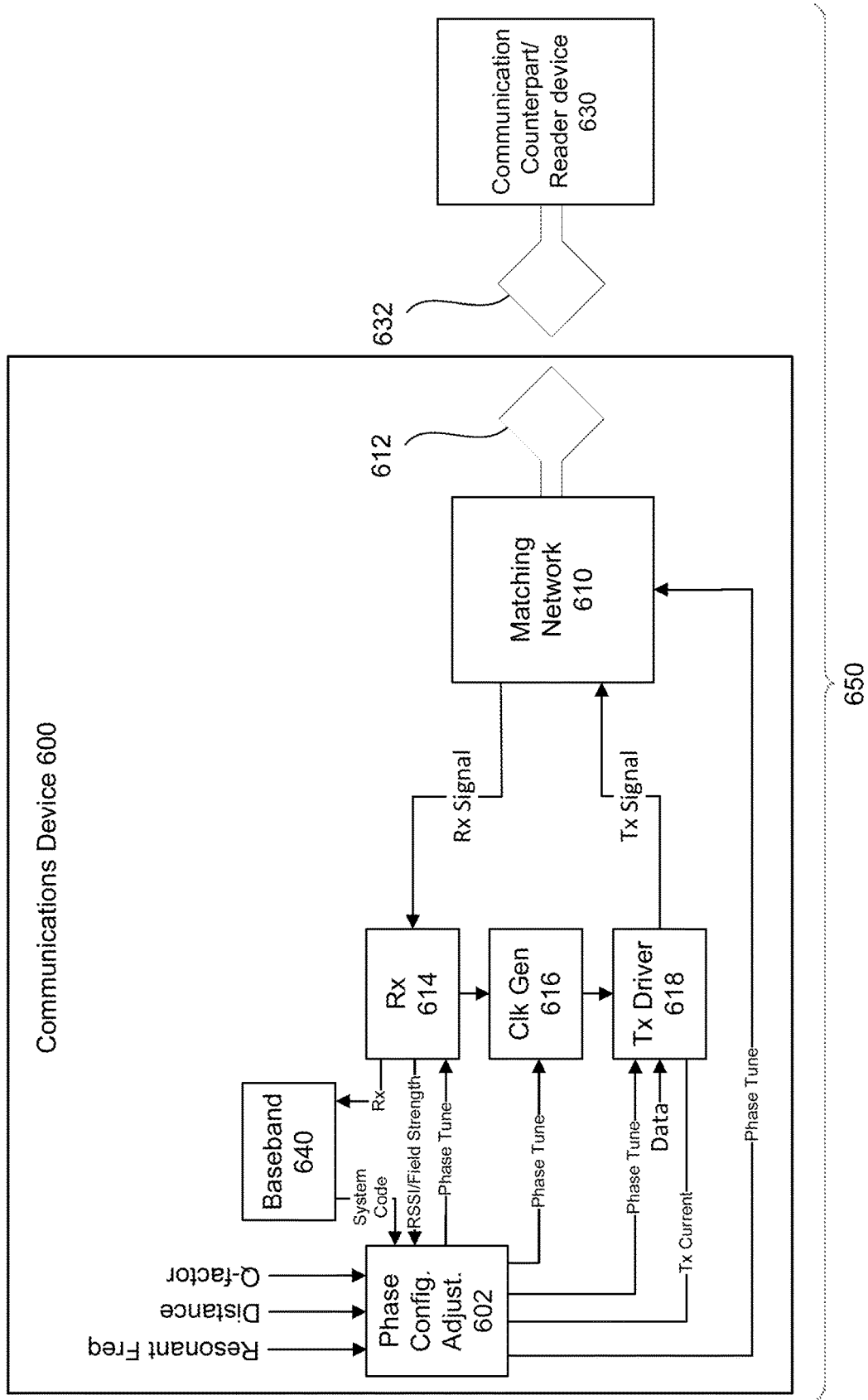
FIG. 6 depicts a second embodiment of the communications device depicted in FIG. 1 that can be used with a corresponding reader to form an inductively coupled communications system.

FIG. 6 depicts a second embodiment of the communications device 100 depicted in FIG. 1 that can be used with a corresponding reader 630 to form an inductively coupled communications system 650. The corresponding reader may be a dedicated reader device or a communications device in reader-mode. In the embodiment depicted in FIG. 6, a communications device 600 includes a phase configuration adjustment module 602, a matching network 610 that is coupled to an antenna 612, an analog receiver "RX" 614, a clock generation circuit 616, and an analog transmitter "TX" 618. The antenna may be an induction type antenna such as a loop antenna. The clock generation circuit generates a clock that is synchronous to the received clock and thus synchronous to the carrier sent out by the reader. In an example operation of the communications device, an RF signal is received by the antenna via inductive coupling from an antenna 632 of the corresponding reader and is passed to the analog receiver to convert the RF signal into a digital signal. A signal is generated from the RF signal by the clock generation circuit and is used to produce an outgoing RF signal at the analog transmitter, which is transmitted via inductive coupling using the antenna. The communications device 600 depicted in FIG. 6 is one possible embodiment of the communications device 100 depicted in FIG. 1. However, the communications device depicted in FIG. 1 is not limited to the embodiment shown in FIG. 6 and the embodiment previously shown in FIG. 3.

In some embodiments, the communications device 600 is an active load modulation (ALM) device. In these embodiments, the antenna can be configured to generate its own magnetic field for transmitting the outgoing RF using a current source, which can result in greater communications distances than PLM devices. In the embodiment depicted in FIG. 6, a phase configuration of the communications device is adjusted in response to at least one system or environmental parameter. Because the phase configuration of the communications device is adjusted in response to at least one system or environmental parameter, components with greater error-tolerance can be used in the RFID device while still maintaining the desired phase arrangement during transmission. The corresponding reader is capable of demodulating the signal because the amplitude of the RF signal captured from the communications device has sufficient SNR and dynamic range.

As compared to FIG. 3, FIG. 6 highlights that a phase configuration of the communications device 600 can be adjusted in response to these system or environmental parameters: a distance information, a geometric information, a system code, a technology code, a transmitter current and/or a transmitter power, a detuning condition, a quality factor of a resonant system associated with the communications device, a resonant frequency of the resonant system associated with the communications device, an RSSI (received signal strength indicator), and/or a field strength of inductive coupling. FIG. 6 shows that the phase configuration adjustment module 602 can adjust a phase configuration of the communications device 600 in response to one or more system or environmental parameters (which include the system or environmental parameters listed above and shown in FIG. 6).

The purpose of the phase configuration adjustment module 602 is to use some or all of the sensor data (e.g., RSSI, system code, etc.) and calculate phase control information depending on those inputs. Note that some sensor data might be generated internally (e.g., RSSI to estimate field strength, transmitter current detection by the driver) or externally (e.g., resonant frequency, distance, etc.). The signatures of the measured sensor data are used as basis for the phase control (function, look up table, decision tree, etc.).

In some embodiments, the distance information can be determined using a proximity sensor. In some embodiments, the proximity sensor can be selected from one or more of the following: ultrasonic sensor, infrared sensor, laser sensor, camera sensor, light sensor, and audio sensor. In some embodiments, the distance information can be a distance between a communications device and a communications counterpart reader device. In some embodiments, the distance information can be a distance between a reader device and a target device.

In some embodiments, the distance information can be one of the following: (1) a floating point or integer representation of a distance in, for example, mm, cm, etc. of a scaled value (Note: the value can be quasi continuous, monotonic, but not necessarily linear), (2) a rounding, scaling, linear or nonlinear function of a distance, (3) a discrete representation of distance. For a discrete representation of distance: it can be, for example, a binary indicator if distance is low or high (based on a threshold); or, it can be, for example, an indicator based on segments (like an enumeration). The distance segments can be like low, mid, high distance (based on respective thresholds), but there could be more segments.

In some embodiments, a phase configuration of the communications device can be adjusted in response to this system or environmental parameter: a geometric information. In some embodiments, the geometric information can be a geometric measurement or a geometric parameter between a communications device and a communications counterpart reader device. In some embodiments, the geometric information can be a geometric measurement or a geometric parameter between a reader device and a target device. In some embodiments, the geometric information can include distance, shift, offset, rotation, etc. (actually, the x/y/z including rotation vector alpha/beta/gamma) and their derivatives (speed).

In some embodiments, the geometric information can be determined using a sensor. In some embodiments, the sensor used can be a gyroscope (there will be specific orientation used during a transaction). In some embodiments, the sensor used can detect speed of movement. In some embodiments, speed will need to be low during a transaction.

In some embodiments, a baseband 640 can provide the system code and/or the technology code.

The phase configuration adjustment module 602 can adjust phase configurations in various components of the communications device 600. The phase configuration adjustment module 602 can adjust phase configurations in various components of the communications device statically, dynamically, or on-the-fly. The phase configuration adjustment module also can adjust phase configurations in various components of the communications device at the time of production and before distribution to consumers/end users. In the embodiment depicted in FIG. 6, the phase configuration adjustment module can adjust phase configurations in the analog receiver "RX" 614, the clock generation circuit 616, and/or the analog transmitter "TX" 618. Although the illustrated phase configuration adjustment module is shown as being separate from the analog receiver, the clock generation circuit, and the analog transmitter, in some embodiments, the phase configuration adjustment module or some portion thereof is implemented within the analog receiver, the clock generation circuit, and/or the analog transmitter.

In some embodiments, the phase configuration adjustment module 602 adjusts the phase configuration of the analog receiver "RX" 614. In an embodiment, the phase configuration adjustment module is implemented within the analog receiver as a delay-locked loop (DLL) whose tap points can be selected (e.g., via a multiplexer based on a recovered clock signal) so as to select a particular phase delay. In another embodiment, the phase configuration adjustment module is implemented within the analog receiver as a dedicated phase shifter. In yet another embodiment, the phase configuration adjustment module is implemented within the analog receiver as a tunable filter (e.g., a bandpass filter).

In some embodiments, the phase configuration adjustment module 602 adjusts the phase configuration of the clock generation circuit 616. In an embodiment, the phase configuration adjustment module is implemented within the clock generation circuit as a delay-locked loop (DLL) whose tap points can be adjusted so as to select a particular phase delay. In another embodiment, the phase configuration adjustment module is implemented within the clock generation circuit as a divider stage used with an integer phase-locked loop (PLL) or a fractional PLL that can be tuned to the desired phase setting. In yet another embodiment, the phase configuration adjustment module is implemented within the clock generation circuit as a dedicated phase shifter. In yet another embodiment, the phase configuration adjustment module is implemented within the clock generation circuit as a clock delay line (e.g. as a buffer).

In some embodiments, the phase configuration adjustment module 602 adjusts the phase configuration of the analog transmitter "TX" 618. In an embodiment, the phase configuration adjustment module is implemented within the analog transmitter as an inverter that can invert signals to be transmitted. In another embodiment, the phase configuration adjustment module is implemented within the analog transmitter as a delay element in the clock path. In yet another embodiment, the phase configuration adjustment module is implemented within the analog transmitter as a slew rate control device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a communications device that communicates via inductive coupling, the method comprising:
adjusting a phase configuration of the communications device in response to at least one system or environmental parameter, wherein the at least one system or environmental parameter comprises a distance information between the communications device and a counterpart device determined using a proximity sensor, wherein the proximity sensor is selected from one or more of the following: ultrasonic sensor, infrared sensor, laser sensor, camera sensor, light sensor, and audio sensor;
modulating a carrier signal with the adjusted phase configuration using active load modulation (ALM); and
transmitting the modulated carrier signal from the communications device for inductive coupling.

2. The method of claim 1, wherein the at least one system or environmental parameter further comprises a system or environmental parameter selected from one or more of the following:
a field strength of inductive coupling;
a coupling condition of inductive coupling;
an antenna geometry of the communications device or a corresponding reader;
a process, voltage and temperature (PVT) variation of the communications device;

a system architecture of the communications device;
a matching network characteristic of the communications device;
a communications protocol of the communications device;
a communications data rate of the communications device;
a retransmission configuration of the communications device;
a reconfiguration setting of the communications device;
a communications timing of the communications device; and
an application of the communications device.

3. The method of claim 2, wherein the system parameter and/or the technology parameter is associated with NFC Forum Digital Protocol.

4. The method of claim 1, wherein adjusting the phase configuration of the communications device comprises adjusting the phase configuration of the communications device according to a function of a group of system or environmental parameters.

5. The method of claim 1, wherein adjusting the phase configuration of the communications device comprises adjusting a phase configuration of an analog receiver of the communications device.

6. The method of claim 5, wherein adjusting the phase configuration of the analog receiver comprises selecting a set of tap points of a delay-locked loop (DLL) of the analog receiver or operating a phase shifter or a tunable filter of the analog receiver.

7. The method of claim 1, wherein adjusting the phase configuration of the communications device comprises adjusting a phase configuration of a clock generation circuit of the communications device.

8. The method of claim 7, wherein adjusting the phase configuration of the clock generation circuit comprises selecting a set of tap points of a phase-locked loop (PLL) of the clock generation circuit or operating a phase shifter or a delay line of the clock generation circuit.

9. The method of claim 1, wherein adjusting the phase configuration of the communications device comprises adjusting a phase configuration of an analog transmitter of the communications device.

10. The method of claim 1, wherein adjusting the phase configuration of the communications device comprises adjusting the phase configuration of the communications device before a transmission of a data frame.

11. The method of claim 1, wherein adjusting the phase configuration of the communications device comprises adjusting the phase configuration of the communications device during a transmission of a data frame.

12. The method of claim 1, further comprising obtaining the at least one system or environmental parameter during a startup of the communications device or before each data frame transmission.

13. The method of claim 1, wherein adjusting the phase configuration of the communications device comprises selecting a set of tap points of a phase-locked loop (PLL) of the communications device.

14. A method for operating a communications device that communicates via inductive coupling, the method comprising:
adjusting a phase of a carrier signal in response to at least one system or environmental parameter, wherein the at least one system or environmental parameter comprises a distance information between the communications device and a counterpart device determined using a proximity sensor, wherein the proximity sensor is selected from one or more of the following: ultrasonic sensor, infrared sensor, laser sensor, camera sensor, light sensor, and audio sensor;
modulating the carrier signal with the adjusted phase using active load modulation (ALM); and
transmitting the modulated carrier signal from the communications device for inductive coupling.

15. The method of claim 14, wherein the at least one system or environmental parameter further comprises a system or environmental parameter selected from one or more of the following:
a field strength of inductive coupling;
a coupling condition of inductive coupling;
an antenna geometry of the communications device or a corresponding reader;
a process, voltage and temperature (PVT) variation of the communications device;
a system architecture of the communications device;
a matching network characteristic of the communications device;
a communications protocol of the communications device;
a communications data rate of the communications device;
a retransmission configuration of the communications device;
a reconfiguration setting of the communications device;
a communications timing of the communications device; and
an application of the communications device.

16. The method of claim 14, wherein adjusting the phase of the carrier signal comprises adjusting the phase of the carrier signal according to a function of a group of system or environmental parameters.

* * * * *